United States Patent [19]

Fong et al.

[11] Patent Number: 4,664,902

[45] Date of Patent: May 12, 1987

[54] RECOVERY OF SULFUR FROM A SOLID SULFUR-CONTAINING SOLUTION OF SOLUBILIZED IRON CHELATE OF NITRILOTRIACETIC ACID

[75] Inventors: Howard L. Fong, Sugarland; Zaida Diaz; George C. Blytas, both of Houston, all of Tex.

[73] Assignee: Shell Oil Company, Houston, Tex.

[21] Appl. No.: 769,198

[22] Filed: Aug. 23, 1985

[51] Int. Cl.$^4$ .................... C01B 17/00; C01B 17/02; C01B 17/16; C01B 31/20
[52] U.S. Cl. ........................ 423/567 A; 423/226; 423/573 R; 423/575
[58] Field of Search ............... 423/567, 573 R, 575, 423/224, 226, 234, 221

[56] References Cited

U.S. PATENT DOCUMENTS

| | | | |
|---|---|---|---|
| 3,097,925 | 7/1963 | Pitts et al. | 23/225 |
| 4,356,155 | 10/1982 | Blytas et al. | 423/573 R |
| 4,517,170 | 5/1985 | Klecka | 423/573 R |
| 4,518,577 | 5/1985 | Klecka | 423/573 R |

OTHER PUBLICATIONS

Derwent Publication, Removal of Hydrogen Sulfide from a Fluid Stream Using a Polyvalent Metal Chelate.

*Primary Examiner*—Gregory A. Heller
*Attorney, Agent, or Firm*—Albert J. Adamcik

[57] ABSTRACT

A process for removal of solid sulfur from specified solubilized iron chelate-containing solutions is described, the process being characterized by melting of the sulfur and maintenance of the solution during the melting and separation operations in the substantial absence of oxygen.

30 Claims, 2 Drawing Figures

4,664,902

RECOVERY OF SULFUR FROM A SOLID SULFUR-CONTAINING SOLUTION OF SOLUBILIZED IRON CHELATE OF NITRILOTRIACETIC ACID

BACKGROUND OF THE INVENTION

The presence of significant quantities of $H_2S$ in various "sour" industrial gaseous streams poses a persistent problem. Although various procedures have been developed to remove and recover this contaminant, most such processes are deficient, for a variety of reasons.

In one cyclic method currently attracting attention, the sour gas is contacted with an aqueous polyvalent metal chelate or complex reactant system to produce solid sulfur which is recovered either prior to or subsequent to regeneration of the reactant. Preferred reactants are iron (III) complexes in which the iron (III) forms chelates with specified organic acids and derivatives thereof.

It has been found that the stability of some reactants employed is temperature dependent, i.e., if the temperature of the solutions is too high, some of the reactants tend to degrade or decompose. In particular, if temperatures above the melting point of sulfur are employed, some systems, such as particular iron chelate systems, tend to decompose.

On the other hand, if a solvent is employed to extract the sulfur from the solution, problems may arise if the solvent exhibits significant solubility in the solution, the gas treated, or the product sulfur. Thus, a need has existed for a gas treating system which would avoid the problems mentioned.

SUMMARY OF THE INVENTION

Accordingly, the invention relates to a process for recovering sulfur from a solid sulfur-containing solution of solubilized iron chelates of nitrilotriacetic acid, the ratio of the solubilized ferric chelate of nitrilotriacetic acid to the solubilized ferrous chelate of nitrilotriacetic acid preferably being from about 0.2 to about 6, comprising:

(a) introducing said solid sulfur-containing solution into an at least substantially oxygen-free zone containing an upper phase comprising a substantially sulfur-free solution of solubilized iron chelates of nitrilotriacetic acid, and a lower phase comprising molten sulfur, the temperature of the zone being maintained at a temperature sufficient to melt the sulfur added, and allowing the solid sulfur added to melt and become part of the lower phase; and (b) recovering molten sulfur from the lower phase.

Generally, solid sulfur content of such solutions will range from about 2 percent to 30 percent by weight, based on the weight of the sulfur and the solution.

In another embodiment, the invention relates to a process for recovering sulfur from a solid sulfur-containing solution of solubilized iron chelates of nitrilotriacetic acid comprising a. heating the sulfur-containing solution, in an at least substantially oxygen-free environment, to a temperature sufficient to melt the sulfur, and producing a solubilized iron chelate-containing solution of nitrilotriacetic acid containing molten sulfur;

b. separating molten sulfur-containing solution from step a in a separation zone maintained at a temperature at or above the melting point of sulfur and having an at least substantially oxygen-free environment into an upper phase containing substantially sulfur-free solution of solubilized iron chelates of nitrilotriacetic acid, and a lower phase comprising molten sulfur; and c. recovering molten sulfur from the separation zone.

Preferably, molten sulfur is recovered by step b and filtered to produce substantially pure molten sulfur. The iron chelate of nitrilotriacetic acid is present in solution as a solubilized species, for example, solubilized ammonium or alkali metal salts of the iron chelate. As used herein, the term "solubilized" refers to the dissolved iron chelate mentioned, whether as a salt of the aforementioned cations, or in some other form, in which the iron chelate exists in solution. Preferably, the ammonium salt is utilized, as described in commonly assigned, copending U.S. Application Ser. No. 769,196, entitled "$H_2S$ Removal Process and Composition", filed even date herewith, incorporated herein by reference. However, the invention may also be employed with more dilute solutions of the iron chelate, wherein the steps taken to prevent iron precipitation are not critical.

In a preferred form, the invention relates to a process for the removal of $H_2S$ from a sour gaseous stream employing an aqueous reactant solution containing solubilized degradable iron chelates comprising (a) contacting the sour gaseous stream with aqueous reactant solution in a contacting zone at a temperature below the melting point of sulfur, the reactant solution containing solubilized ferric chelate of nitrilotriacetic acid, under conditions to convert $H_2S$, producing a gaseous stream having reduced $H_2S$ content, and aqueous admixture containing solid sulfur and an increased concentration of solubilized ferrous chelate of nitrilotriacetic acid, the ratio of the solubilized ferric chelate of nitrilotriacetic acid to ferrous chelate in said reactant solution being from 0.2 to 6;

(b) removing aqueous admixture from the contacting zone and separating a minor portion of said admixture having an increased solid sulfur concentration, and introducing admixture having an increased solid sulfur concentration into an at least substantially oxygen-free zone containing an upper phase comprising a substantially sulfur-free solution of solubilized iron chelates of nitrilotriacetic acid, and a lower phase comprising molten sulfur, the temperature of the zone being maintained at a temperature sufficient to melt the sulfur added, and allowing the solid sulfur added to melt and become part of the lower phase;

(c) recovering molten sulfur from the lower phase;

(d) regenerating the major portion of said admixture by contacting admixture to be regenerated with oxygen in a regeneration zone under conditions to convert solubilized ferrous chelate of nitrilotriacetic acid in the admixture to the solubilized ferric chelate of nitrilotriacetic acid, and producing regenerated aqueous reactant solution having a ratio of solubilized ferric chelate of nitrilotriacetic acid to solubilized ferrous chelate of nitrilotriacetic acid of from 0.5 to 6; and (e) passing regenerated aqueous reactant solution from step (d) to the contacting zone for use as aqueous reactant solution therein.

Alternately, the invention relates to a process for the removal of $H_2S$ from a sour gaseous stream employing an aqueous reactant solution containing solubilized degradable iron chelates comprising (a) contacting the sour gaseous stream with aqueous reactant solution in a contacting zone at a temperature below the melting point of sulfur, the reactant solution containing solubilized ferric chelate of nitrilotriacetic acid, and solubilized ferrous chelate of nitrilotriacetic acid, under conditions to convert $H_2S$, producing a gaseous stream having a reduced $H_2S$ content, and aqueous admixture containing solid sulfur and an increased concentration of solubilized ferrous chelate of nitrilotriacetic acid, the ratio of the solubilized ferric chelate of nitrilotriacetic acid to solubilized ferrous chelate of nitrilotriacetic acid in said reactant solution being from 0.2 to 6;

(b) removing aqueous admixture from the contacting zone and regenerating admixture by contacting admixture to be regenerated with oxygen in a regeneration zone under conditions to convert solubilized ferrous chelate of nitrilotriacetic acid in the admixture to the solubilized ferric chelate of nitrilotriacetic acid, and producing regenerated reactant solution containing solid sulfur having a ratio of solubilized ferric chelate of nitrilotriacetic acid to solubilized ferrous chelate of nitrilotriacetic acid of from 0.5 to 6;

(c) separating a minor portion of said regenerated reactant mixture having an increased solid sulfur concentration, and introducing admixture having an increased solid sulfur concentration into an at least substantially oxygen-free zone containing an upper phase comprising a substantially oxygen-free solution of solubilized iron chelates of nitrilotriacetic acid, and a lower phase comprising molten sulfur, the temperature of the zone being maintained at a temperature sufficient to melt the sulfur added, and allowing the solid sulfur added to melt and become part of the lower phase;

(d) recovering molten sulfur from the lower phase; and (e) passing regenerated aqueous reactant solution from step (c) to the contacting zone for use as aqueous reactant solution therein.

In an even more preferred form, the invention comprises a process for the removal of $H_2S$ from a sour gaseous stream employing an aqueous reactant solution containing solubilized degradable iron chelates comprising a. contacting the sour gaseous stream with aqueous reactant solution in a contacting zone at a temperature below the melting point of sulfur, the reactant solution containing solubilized ferric chelate of nitrilotriacetic acid, and solubilized ferrous chelate of nitrilotriacetic acid, under conditions to convert $H_2S$, producing a gaseous stream having a reduced $H_2S$ content, and aqueous admixture containing solid sulfur and an increased concentration of solubilized ferrous chelate of nitrilotriacetic acid, the ratio of solubilized ferric chelate of nitrilotriacetic acid to solubilized ferrous chelate of nitrilotriacetic acid in said reactant solution being from 0.2 to 6;

b. removing aqueous admixture from the contacting zone and separating a minor portion of said admixture having an increased solid sulfur concentration, and heating admixture having an increased solid sulfur concentration in an at least substantially oxygen-free environment to a temperature sufficient to melt the sulfur, and producing a solution of solubilized iron chelate of nitrilotriacetic acid containing molten sulfur;

c. separating molten sulfur-containing solution from step b in a separation zone maintained at a temperature at or above the melting point of sulfur and having an at least substantially oxygen-free environment into an upper phase comprising substantially sulfur-free solution of solubilized iron chelate of nitrilotriacetic acid and a lower phase comprising molten sulfur;

d. recovering molten sulfur from said separation zone;

e. regenerating the major portion of said admixture by contacting admixture to be regenerated with oxygen in a regeneration zone under conditions to convert solubilized ferrous chelate of nitrilotriacetic acid in the admixture to solubilized ferric chelate of nitrilotriacetic acid, and producing regenerated aqueous reactant solution having a ratio of solubilized ferric chelate of nitrilotriacetic acid to solubilized ferrous chelate of nitrilotriacetic acid of from 0.5 to 6; and f. passing regenerated aqueous reactant solution from step c to the contacting zone for use as aqueous reactant solution therein.

Most preferably, molten sulfur is recovered from the separation zone and filtered to remove trace solid impurities and produce substantially pure molten sulfur.

In another embodiment of the invention, the sulfur may be separated after regeneration. Accordingly, the invention, in this embodiment, comprises a process for the removal of $H_2S$ from a sour gaseous stream employing an aqueous reactant solution containing solubilized degradable iron chelates comprising:

a. contacting the sour gaseous stream with aqueous reactant solution in a contacting zone at a temperature below the melting point of sulfur, the reactant solution containing solubilized ferric chelate of nitrilotriacetic acid, and solubilized ferrous Fe(II) chelate of nitrilotriacetic acid, under conditions to convert $H_2S$, producing a gaseous stream having a reduced $H_2S$ content, and an aqueous admixture containing solid sulfur and an increased concentration of solubilized ferrous chelate of nitrilotriacetic acid, the ratio of solubilized ferric chelate of nitrilotriacetic acid to solubilized ferrous chelate of nitrilotriacetic acid in said admixture being from 0.2 to 6;

b. regenerating admixture by contacting admixture to be regenerated with oxygen in a regeneration zone under conditions to convert solubilized ferrous chelate of nitrilotriacetic acid in the admixture to the solubilized ferric chelate of nitrilotriacetic acid, and producing regenerated reactant solution containing solid sulfur having a ratio of solubilized ferric chelate of nitrilotriacetic acid to solubilized ferrous chelate of nitrilotriacetic acid of from 0.5 to 6;

c. separating a minor portion of said regenerated reactant mixture having an increased solid sulfur concentration, and heating separated regenerated reactant mixture having an increased solid sulfur concentration to a temperature sufficient to melt the sulfur, and producing a solution of solubilized iron chelates of nitrilotriacetic acid containing molten sulfur;

d. seperating molten sulfur-containing solution from step c in a separation zone maintained at a temperature at or above the melting point of sulfur and having an at least substantially oxygen-free environment into an upper phase comprising substantially sulfur-free regenerated solution of solubilized iron chelates of nitrilotriacetic acid and a lower phase comprising molten sulfur;

e. recovering molten sulfur from said separation zone; and f. passing regenerated aqueous reactant solution from step d to the contacting zone for use as aqueous reactant solution therein.

As indicated previously, the molten sulfur is preferably recovered from the separation zone and filtered to remove trace impurities and produce substantially pure molten sulfur.

This embodiment, while feasible, is not as desirable as the case where the sulfur is recovered prior to regeneration. As indicated, solid sulfur contents of separated admixture having increased sulfur content will range from 2 to 30 percent by weight, based on the weight of the solution and the sulfur. Various temperatures are ascribed to the melting point of sulfur. For example, Encyclopedia of Chemical Technology (Kirk-Othmer), copyright 1969, ascribes the melting point of monoclinic sulfur to be 114.5° C., of rhombic sulfur, 110.2° C. In the cases described, the temperature of the zone must be maintained at a sufficient level to insure that the sulfur present or added will be melted. Preferably, such a temperature will range from about 155° C. to 160° C. or even to 180° C.

As used herein, the term "an at least substantially oxygen-free environment" implies that oxygen is to be excluded from the separation and filtering operations to the extent practicable, extreme measures to insure an atmosphere devoid of quite minute concentrations of oxygen being unnecessary. Suitable means for the exclusion of oxygen include vacuum, and, more preferably, the presence of inert gases such as nitrogen or helium. In a preferred embodiment, a reducing gas, e.g., a slip stream of the $H_2S$ containing gas, may be used to ensure that a non-oxidizing atmosphere is employed. The reducing gas may also be employed, where desired, or necessary, to maintain a high ferrous to ferric chelate ratio by contacting the separated admixture with increased sulfur concentration with the reducing gas, e.g., with the aforementioned slip stream.

Nevertheless, as indicated, the regeneration of the reactant is accomplished by the utilization of oxygen, preferably as air. As used herein, the term "oxygen" is not limited to "pure" oxygen, but includes air, air enriched with oxygen, or other oxygen-containing gases. The oxygen will accomplish two functions, the oxidation of ferrous iron of the reactant to the ferric state, and the stripping of any residual dissolved gas (if originally present) from the aqueous mixture. The oxygen (in whatever form supplied) is supplied in a stoichiometric equivalent or excess with respect to the amount of solubilized iron chelate to be oxidized to the ferric state. Preferably, the oxygen is supplied in an amount of from about 20 percent to about 300 percent excess.

DETAILED DESCRIPTION OF THE INVENTION

Figure 1:
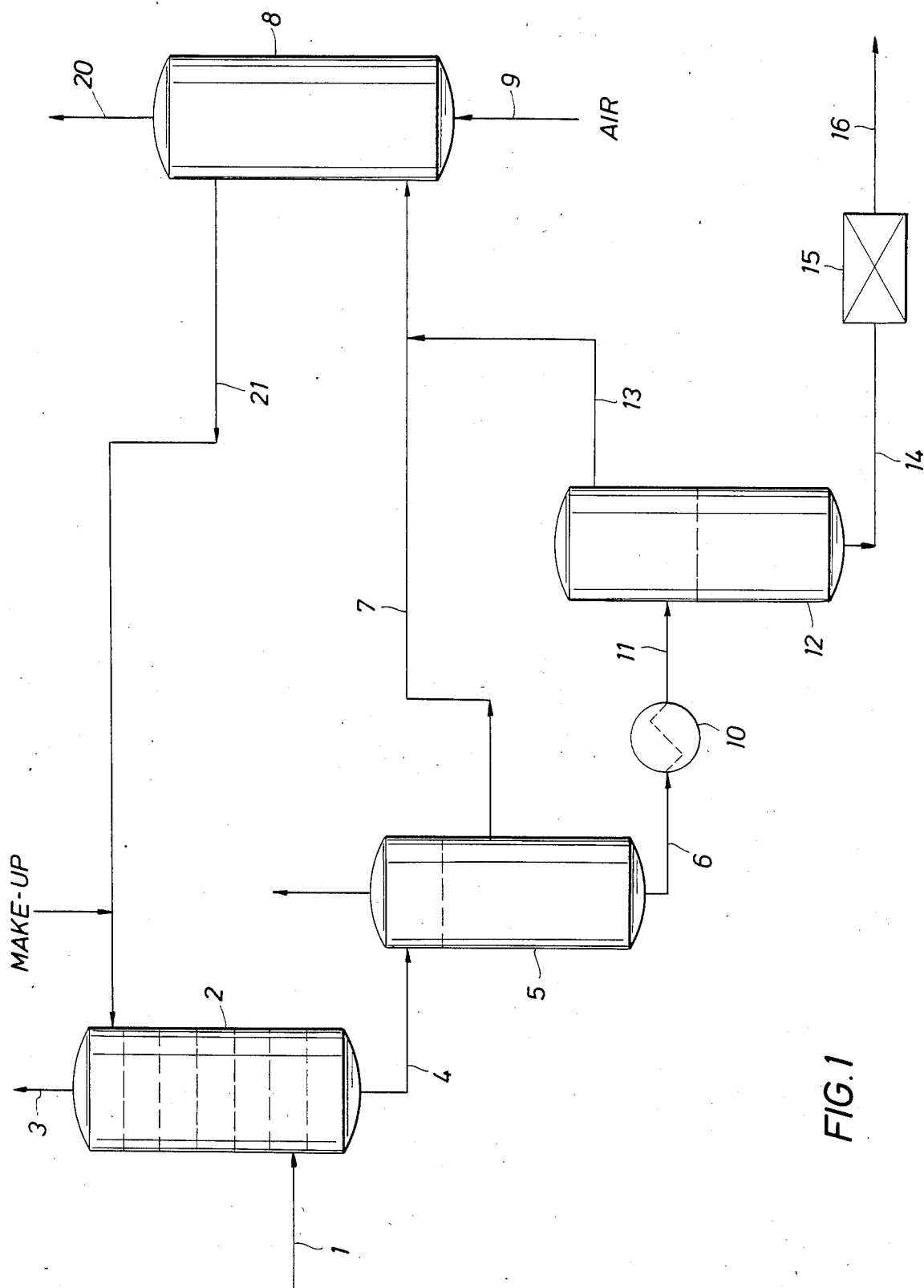

The particular type of sour gaseous stream treated is not critical, the only practical limitation being the reactivity of the stream itself with the solutions employed, as will be evident to those skilled in the art. Streams particularly suited to removal of $H_2S$ by the practice of the invention are, as indicated, naturally-occurring gases, recycled $CO_2$ used in enhanced oil recovery, synthesis gases, process gases, and fuel gases produced by gasification procedures, e.g., gases produced by the gasification of coal, petroleum, shale, tar sands, etc. Particularly preferred are coal gasification streams, natural gas streams, produced and recycled $CO_2$ streams, and refinery feedstocks composed of gaseous hydrocarbon streams, especially those streams of this type having a low ratio of $H_2S$ to $CO_2$, and other gaseous hydrocarbon streams. The term "hydrocarbon stream(s)", as employed herein, is intended to include streams containing significant quantites of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.005 percent to about 10 percent by volume. $CO_2$ content will also vary, but may range from about 0.1 percent to about 99.0 percent (or more) by volume. In this context, the invention may be used to remove $H_2S$ from various $CO_2$ streams, e.g., supercritical $CO_2$ streams. Obviously, the amounts of $H_2S$ and $CO_2$ present are not generally a limiting factor in the practice of the invention.

The temperatures employed in the contacting zone are not generally critical, except that the reaction is carried out below the melting point of sulfur. In many commercial applications, such as removal of $H_2S$ from natural gas to meet pipeline specifications, absorption at ambient temperatures is desired. In general, temperatures of from 10° C. to 80° C. are suitable, and temperatures of from 20° C. to 60° C. are preferred. Total contact times will range from about 1 second to about 120 seconds, with contact times of 2 seconds to 60 seconds being preferred.

Similarly, in the regeneration or stripping zone or zones, temperatures may be varied widely. Preferably, the regeneration zone should be maintained at somewhat lower temperatures compared to the contacting zone. In general, temperatures of from about 10° C. to 80° C., preferably 20° C. to 50° C. may be employed.

Pressure conditions in the contacting zone may vary widely, depending on the pressure of the gas to be treated. For example, pressures in the contacting zone may vary from one atmosphere up to one hundred fifty or even two hundred atmospheres. Pressures of from one atmosphere to about one hundred atmospheres are preferred. In the regeneration zone, pressures may be varied considerably and will preferably range from about one atmosphere to about three or four atmospheres. Residence times for given volumes of admixture and oxygen will range from 10 minutes to 60 minutes, preferably from 20 minutes to 40 minutes. The pressure, fluid flow, and temperature relationships involved are well understood by those skilled in the art, and need not be detailed herein. Other conditions of operation for this type of reaction process are further described in U.S. Pat. No. 3,068,065 to Hartley et al, dated Dec. 11, 1962, incorporated herein by reference. Preferably, pH in the regeneration zone will range from about 6.5 to about 8.5, and the molar ratio of the nitrilotriacetic acid to total solubilized iron is from about 1.0 to 1.5. The process is preferably conducted continuously.

As indicated, the $H_2S$, when contacted, is rapidly converted in the process of the invention by the solubilized ferric chelate of nitrilotriacetic acid to solid elemental sulfur. Since the iron chelates per se have limited solubility in water, the iron chelate compound or compounds are preferably supplied, as indicated previously. The amount of solubilized ferric chelate of nitrilotriacetic acid supplied or employed in solution is an amount sufficient to reduce the $H_2S$ concentration or content of the stream to the desired level. If total or substantially total removal is desired, the total amount supplied will generally be on the order of at least about two mols per mol of $H_2S$. Ratios of from about 2 mols to about 15 mols of solubilized ferric chelate of nitrilotriacetic acid per mol of $H_2S$ may be used, with ratios from about 2 mols per mol to about 5 mols of solubilized ferric chelate per mol of $H_2S$ being preferred. The ratio of the ferric chelate of nitrilotriacetic acid to the ferrous chelate of nitrilotriacetic acid present in the contacting solution will normally be less than about 6, and will normally range from about 0.2 to about 6, preferably about 0.5 to about 6. The chelate solution will generally be supplied as an aqueous solution having a concentration of from about 0.1 molar to about 3 molar, and a concentration of about 0.5 to 1.5 molar is preferred. As mentioned, the total iron concentration of the solution, as the chelates, is from about 0.01 percent to about 7 percent by weight, preferably 0.5 to about 7 percent by weight, based on the weight of solution and iron. As indicated, the solubilized iron chelates of nitrilotriacetic acid may be formed in aqueous solution by the reaction of an appropriate salt, oxide, or hydroxide of iron and nitrilotriacetic acid, in the presence of alkali metal or ammonium ions, or with the ammonium or alkali metal salt.

ILLUSTRATIVE EMBODIMENT

Figure 2:
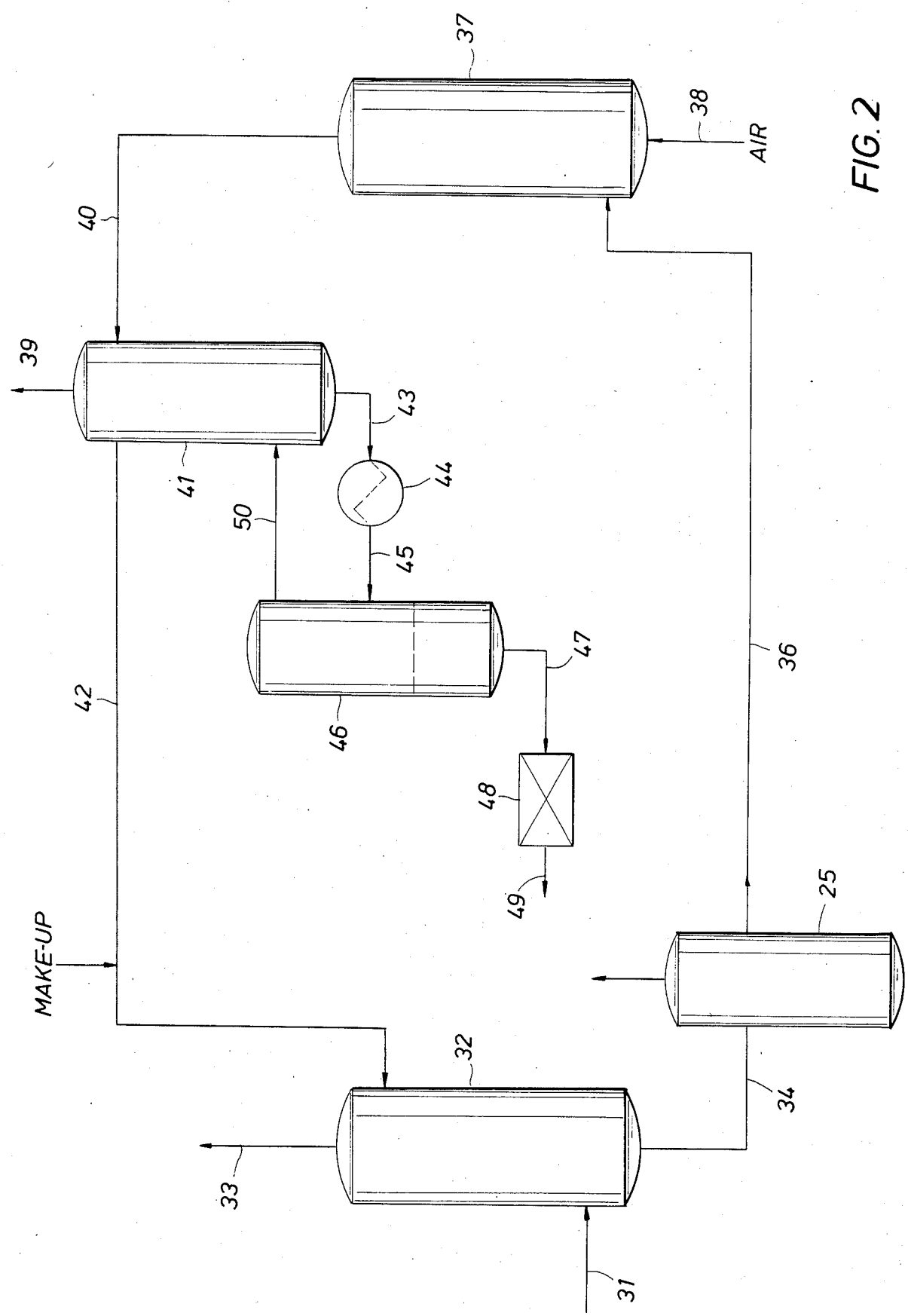

In order to describe the invention in greater detail, reference is made to the accompanying schematic drawing. FIG. 1 illustrates the embodiment of the invention wherein sulfur removal is accomplished prior to regeneration, while FIG. 2 illustrates the practice of the invention wherein sulfur removal is accomplished after regeneration. All values are calculated or merely exemplary, and all flows, unless stated otherwise, are continuous.

As shown, sour gas, e.g., natural gas containing about 0.5 percent $H_2S$, in line (1) enters contactor or column (2) into which also enters an aqueous mixture comprising an aqueous 0.8 M solution of ammonium ferric nitrilotriacetate chelate, which mixture also contains 0.2 moles per liter of the ammonium ferrous nitrilotriacetate chelate. The solution is produced by utilization of the reducing effect of the $H_2S$ in the gaseous stream. That is, the initial solution in the contactor is a 1 M aqueous solution of ferric nitrilotriacetate also containing enough added ammonium hydroxide to maintain solution pH at 6.5 to 8.5. After startup, and reaction with the $H_2S$ in the gaseous stream, regeneration, described hereinafter, is controlled so that regeneration of the ammonium ferric nitrilotriacetate chelate is not complete, in the ratios mentioned. Absorber or contactor (2) may be of any suitable type, such as a packed column, tray column or spray column, but is preferably a combination venturi-sparged column system or venturi-sprayed column system, as described in commonly assigned, copending application Ser. No. 769,199, entitled "Staged Removal of $H_2S$ from Gas Streams", filed even date herewith. Depending on the size of the gas stream, the $H_2S$ content, etc., more than one contactor unit may be employed, preferably in series. In any event, in the unit illustrated, the pressure of the feed gas is about 1200 p.s.i.g., and the temperature of the aqueous mixture is about 45° C. A contact time of about 120 seconds is employed in order to react all the $H_2S$. Purified or "sweet" gas leaves column (2) through line (3). The "sweet" gas is of a purity sufficient to meet standard requirements. In the mixture, the $H_2S$ is converted to solid elemental sulfur by the solubilized ferric chelate, the ferric chelate in the process being converted to the solubilized ferrous chelate. The aqueous admixture produced, containing elemental sulfur, is removed continuously, and sent through line (4) to a depressurization and degassing unit (5), which also serves as a sulfur settler or separation zone. A minor portion, e.g., 5 to 10 percent by volume of the admixture in concentrator or thickener (5), and containing an increased sulfur concentration, is continuously withdrawn from the lower portion of concentrator (5) and sent via line (6) to sulfur recovery. The solid sulfur content of the portion removed should be as high as possible, although it is not necessary that all the solid sulfur particles be removed from the admixture. As those skilled in the art will recognize, the major portion may contain some quite minor quantities of sulfur, and such a circulating inventory does not interfere in the subsequent regeneration or in the contact zone. Other types of concentrators, such as a hydroclone, may be employed. The major portion of the aqueous admixture in vessel (5) is removed via line (7) for regeneration of solubilized ferric chelate. In regeneration zone or column (8), the admixture is contacted with excess air from line (9) to convert part of the solubilized ferrous chelate to the solubilized ferric chelate.

Sulfur recovery is accomplished, as follows: The admixture in line (6) is passed through heat exchanger (10), e.g., a double pipe heat exchanger, and the temperature of the solution is raised to 120° C., thus melting the sulfur in the admixture. The molten sulfur-containing admixture is then passed via line (11) to separator (12) wherein the admixture is separated into an upper solution (admixture) phase and a lower molten sulfur phase. Both the melting in melter (10) and the separation in unit (12) are carried out in the absence of oxygen. As inert head of nitrogen may be employed, if desired, in separator (12). Admixture or solution in the upper phase is withdrawn via line (13) and sent to regenerator (8). Total residence of the solution in the separator should be minimized, e.g., 5 to 60 minutes, preferably 10 to 30 minutes. As those skilled in the art will recognize, the solution may be recovered and returned to any locus or point in the cycle, such as the contact zone, if appropriate adjustment is made. Molten sulfur is recovered from separator (12) via line (14) and preferably sent to filter or filters (15) where solid impurities such as carbonaceous matter or iron sulfide are removed. As will be recognized by those skilled in the art, separator (12), line (14), and filter(s) (15) will be heated or well insulated to prevent solidification of the sulfur. The separated molten sulfur is sent via line (16) to recovery or storage.

Regeneration zone (8) comprises a sparged tower regenerator with cocurrent upflow of oxygen (as air) and aqueous admixture. Air velocity in the regenerator is in the range of 0.1 to 0.3 feet per second. The temperature in the column is about 45° C., and overall pressure is about 2 atmospheres. Spent air is removed via line (20), and regenerated admixture, having a ratio of solubilized ferric chelate of nitrilotriacetic acid to solubilized ferrous chelate of nitrilotriacetic acid of about 4, is returned via line (21) to column (2).

In FIG. 2, sour gas e.g., natural gas containing about 0.5 percent $H_2S$, and 32 percent by volume $CO_2$, in line (31) enters column (32) (sparged column type) and contacts an aqueous 0.8 M solution of ammonium ferric nitrilotriacetic chelate, also containing 0.2 moles per liter ammonium ferrous nitrilotriate chelate. The pressure of the feed gas is about 1200 p.s.i.g., and the temperature of the aqueous mixture is about 45° C. A contact time of about 45 seconds is employed in order to react all the $H_2S$. Purified or "sweet" gas leaves column (32) through line (33). The "sweet" gas is of a purity sufficient to meet standard requirements. In the aqueous mixture, the $H_2S$ is converted to elemental sulfur by the solubilized ferric chelate. The aqueous mixture, containing elemental sulfur, a slight amount of absorbed $CO_2$, and about 0.5 moles per liter solubilized ferrous chelate, is removed continuously and sent through line (34) to degassing. As shown, any $CO_2$ absorbed is removed in unit (25) by reduction of pressure, and the admixture forwarded via line (36) to column (37).

In regeneration zone (37), admixture is treated in a similar fashion to that described with reference to FIG. 1. Solubilized ferrous nitrilotriacetate chelate is converted by oxygen (line 38) to the solubilized ferric chelate, while maintaining sufficient solubilized ferrous chelate of nitrilotriacetic acid to inhibit degradation of the iron chelates. The temperature of the column (37) is about 45° C., and pressure in the column is maintained at about 2 atmospheres. The regenerated admixture, which still contains elemental sulfur and spent excess air, is sent through line (40) to degassing and thickening zone (41). Spent air is removed from column (41) through line (39). From unit (41), which corresponds to concentration or separator (5), major and minor portions of the regenerated, solid sulfur-containing admixture are separated, the major portion being sent through line (42) to the contactor (32). The minor portion, e.g., 5 percent by volume of the mixture in (41), and containing an increased sulfur content, is sent through line (43) to melter (44), thence through line (45) to separator (46) in the manner described in relation to FIG. 1, in the absence of oxygen. Similarly, molten sulfur is recovered from (46) via line (47), and is preferably filtered in filter(s) (48) to provide sulfur in line (49). Admixture from separator (46) is returned to thickener (41) via line (50).

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, a contacting zone may comprise two separate countercurrent columns in which the solution from the lower portion of the first column would be introduced into the upper portion of the second column, the partially purified gaseous material produced from the upper portion of the first column being fed into the lower portion of the second column. Parallel operation of units, is of course, well within the scope of the invention. Admixture or solution withdrawal or introduction may be made at any suitable site(s) or loci in the particular zone.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate, and sodium acetate, which are beneficial, and other additives, such as antifoaming and/or wetting agents, may be employed.

What is claimed is:

1. A process for recovering sulfur from a solid sulfur-containing solution of solubilized iron chelate of nitrilotriacetic acid comprising
   (a) introducing said solid sulfur-containing solution into an at least substantially oxygen-free zone containing an upper phase comprising a substantially sulfur-free solution of solubilized iron chelates of nitrilotriacetic acid, and a lower phase comprising molten sulfur, the temperature of the zone being maintained at a temperature sufficient to melt the sulfur added, and allowing the solid sulfur added to melt and become part of the lower phase; and
   (b) recovering molten sulfur from the lower phase.

2. The process of claim 1 wherein the solid sulfur-containing solution contains from 2 to 30 percent by weight of sulfur, based on the weight of the solution and the sulfur.

3. A process for recovering sulfur from a solid sulfur-containing solution of a solubilized iron chelate of nitrilotriacetic acid comprising
   (a) heating the sulfur-containing solution, in an at least substantially oxygen-free environment, to a temperature sufficient to melt the sulfur, and producing a solution of said solubilized iron chelate of nitrilotriacetic acid containing molten sulfur;
   (b) separating molten sulfur-containing solution from step (a) in a separation zone maintained at a temperature at or above the melting point of sulfur and having an at least substantially oxygen-free environment into an upper phase containing substantially sulfur-free solution of solubilized iron chelates of nitrilotriacetic acid and a lower phase admixture comprising molten sulfur; and
   (c) recovering molten sulfur from the separation zone.

4. A process for recovering sulfur from a solid sulfur-containing solution of a solubilized iron chelate of nitrilotriacetic acid comprising
   (a) heating the sulfur-containing solution, in an at least substantially oxygen-free environment, to a temperature sufficient to melt the sulfur, and producing a solution of said solubilized iron chelate of nitrilotriacetic acid containing molten sulfur;
   (b) separating molten sulfur-containing solution from step (a) in a separation zone maintained at a temperature at or above the melting point of sulfur and having an at least substantially oxygen-free environment into an upper phase containing substantially sulfur-free solution of solubilized iron chelates of nitrilotriacetic acid and a lower phase comprising molten sulfur; and
   (c) filtering sulfur from step (b) to produce substantially pure molten sulfur.

5. A process for the removal of $H_2S$ from a sour gaseous stream employing an aqueous reactant solution containing solubilized degradable iron chelates comprising
   (a) contacting the sour gaseous stream with aqueous reactant solution in a contacting zone at a temperature below the melting point of sulfur, the reactant solution containing solubilized ferric chelate of nitrilotriacetic acid, under conditions to convert $H_2S$, producing a gaseous stream having reduced $H_2S$ content, and aqueous admixture containing solid sulfur and an increased concentration of solubilized ferrous chelate of nitrilotriacetic acid, and ratio of the solubilized ferric chelate of nitrilotriacetic acid to ferrous chelate in said reactant solution being from 0.2 to 6;

(b) removing aqueous admixture from the contacting zone and separating a minor portion of said admixture having an increased solid sulfur concentration, and introducing admixture having an increased sulfur concentration into an at least substantially oxygen-free zone containing an upper phase comprising a substantially sulfur-free solution of solubilized iron chelates of nitrilotriacetic acid, and a lower phase comprising molten sulfur, the temperature of the zone being maintained at a temperature sufficient to melt the sulfur added, and allowing the solid sulfur added to melt and become part of the lower phase;

(c) recovering molten sulfur from the lower phase;

(d) regenerating the major portion of said admixture by contacting admixture to be regenerated with oxygen in a regeneration zone under conditions to convert solubilized ferrous chelate of nitrilotriacetic acid in the admixture to the solubilized ferric chelate of nitrilotriacetic acid, and producing regenerated aqueous reactant solution having a ratio of solubilized ferric chelate of nitrilotriacetic acid to solubilized ferrous chelate of nitrilotriacetic acid of from 0.5 to 6; and (e) passing regenerated aqueous reactant solution from step (d) to the contacting zone for use as aqueous reactant solution therein.

6. A process for the removal of the $H_2S$ from a sour gaseous stream employing an aqueous reactant solution containing solubilized degradable iron chelates comprising (a) contacting the sour gaseous stream with aqueous reactant solution in a contacting zone at a temperature below the melting point of sulfur, the reactant solution containing solubilized ferric chelate of nitrilotriacetic acid, and solubilized ferrous chelate of nitrilotriacetic acid, under conditions to convert $H_2S$, producing a gaseous stream having a reduced $H_2S$ content, and aqueous admixture containing solid sulfur and an increased concentration of solubilized ferrous chelate of nitrilotriacetic acid, the ratio of the solubilized ferric chelate of nitrilotriacetic acid to solubilized ferrous chelate of nitrilotriacetic acid in said reactant solution being from 0.2 to 6;

(b) removing aqueous admixture from the contacting zone and regenerating admixture by contacting admixture to be regenerated with oxygen in a regeneration zone under conditions to convert solubilized ferrous chelate of nitrilotriacetic acid in the admixture to the solubilized ferric chelate of nitrilotriacetic acid, and producing regenerated reactant solution containing solid sulfur having a ratio of solubilized ferric chelate of nitrilotriacetic acid to solubilized ferrous chelate of nitrilotriacetic acid of from 0.5 to 6;

(c) separating a minor portion of said regenerated reactant mixture having an increased solid sulfur concentration, and introducing admixture having an increased solid sulfur concentration into an at least substantially oxygen-free zone containing an upper phase comprising a substantially sulfur-free solution of solubilized iron chelates of nitrilotriacetic acid, and a lower phase comprising molten sulfur, the temperature of the zone being maintained at a temperature sufficient to melt the sulfur added, and allowing the solid sulfur added to melt and become part of the lower phase;

(d) recovering molten sulfur from the lower phase; and (e) passing regenerated aqueous reactant solution from step (c) to the contacting zone for use as aqueous reactant solution therein.

7. A process for the removal of $H_2S$ from a sour gaseous stream employing an aqueous reactant solution containing solubilized degradable iron chelates comprising (a) contacing the sour gaseous stream with aqueous reactant solution in a contacting zone at a temperature below the melting point of sulfur, the reactant solution containing solubilized ferric chelate of nitrilotriacetic acid, under conditions to convert $H_2S$, producing a gaseous stream having reduced $H_2S$ content, and aqueous admixture containing solid sulfur and an increased concentration of solubilized ferrous chelate of nitrilotriacetic acid, the ratio of the solubilized ferric chelate of nitrilotriacetic acid to ferrous chelate of nitrilotriacetic acid in said reactant solution being from 0.2 to 6;

(b) removing aqueous admixture from the contacting zone and separating a minor portion of said admixture having an increased sulfur concentration, and heating admixture having an increased sulfur concentration in an at least substantially oxygen free environment to a temperature sufficient to melt the sulfur, and producing a solution of solubilized iron chelates of nitrilotriacetic acid containing molten sulfur;

(c) separating molten-sulfur containing solution from step (b) in a separation zone in an at least substantially-oxygen free environment into an upper phase comprising substantially-sulfur free solution of solubilized iron chelates of nitrilotriacetic acid and a lower phase comprising molten sulfur;

(d) recovering molten sulfur from said separation zone;

(e) regenerating the major portion of said admixture by contacting admixture to be regenerated with oxygen in a regeneration zone under conditions to convert solubilized ferrous chelate of nitrilotriacetic acid in the admixture to the solubilized ferric chelate of nitrilotriacetic acid and producing regenerated aqueous reactant solution having a ratio of solubilized ferric chelate of nitrilotriacetic acid to solubilized ferrous chelate of nitrilotriacetic acid of from 0.5 to 6; and (f) passing regenerated aqueous reactant solution from step e) to the contacting zone for use as aqueous reactant solution therein.

8. A process for the removal of $H_2S$ from a sour gaseous stream employing an aqueous reactant solution containing solubilized degradable iron chelates comprising (a) contacting the sour gaseous stream with aqueous reactant solution in a contacting zone at a temperature below the melting point of sulfur, the reactant solution containing solubilized ferric chelate of nitrilotriacetic acid, under conditions to convert $H_2S$, producing a gaseous stream having reduced $H_2S$ content, and aqueous admixture containing solid sulfur and an increased concentration of solubilized ferrous chelate of nitrilotriacetic acid, the ratio of solubilized ferric chelate of nitrilotriacetic acid to solubilized ferrous chelate of nitrilotriacetic acid in said reactant solution being from 0.2 to 6;

(b) removing aqueous admixture from the contacting zone and separating a minor portion of said admixture having an increased solid sulfur concentration, and heating admixture having an increased solid sulfur concentration in an at least substantially oxygen-free environment to a temperature sufficient to melt the sulfur, and producing a solution of solubilized iron chelates of nitrilotriacetic acid containing molten sulfur;

(c) separating molten sulfur-containing solution from step (b) in a separation zone in an at least substantially oxygen-free environment into an upper phase comprising substantially sulfur-free solution of solubilized iron chelates of nitrilotriacetic acid and a lower phase comprising molten sulfur;

(d) filtering sulfur from step (c) to produce substantially pure molten sulfur;

(e) regenerating the major portion of said admixture by contacting admixture to be regenerated with oxygen in a regeneration zone under conditions to convert solubilized ferrous chelate of nitrilotriacetic acid; in the admixture to the solubilized ferric chelate of nitrilotriacetic acid; and producing regenerated aqueous reactant solution having a ratio of solubilized ferric chelate of nitrilotriacetic acid to solubilized ferrous chelate of nitrolotriacetic acid of from 0.5 to 6; and (f) passing regenerated aqueous reactant solution from step e) to the contacting zone for use as aqueous reactant solution therein.

9. The process of claim 8 wherein the stream from which the $H_2S$ is removed is selected from naturally-occurring gases, synthesis gases, process gases, $CO_2$-containing streams, and fuel gases.

10. The process of claim 9 wherein the sour gaseous stream is natural gas or a stream derived from the gasification of coal or a liquid hydrocarbon.

11. The process of claim 9 wherein the sour gaseous stream is natural gas.

12. The process for the removal of $H_2S$ from a sour gaseous stream employing an aqueous reactant solution containing solubilized degradable iron chelates comprising (a) contacting the sour gaseous stream with aqueous reactant solution in a contacting zone at a temperature below the melting point of sulfur, the reactant solution containing solubilized ferric chelate of nitrilotriacetic acid, and solubilized ferrous chelate of nitrilotriacetic acid, under conditions to convert $H_2S$, producing a gaseous stream having a reduced $H_2S$ content, and aqueous admixture containing solid sulfur and an increased concentration of solubilized ferrous chelate of nitrilotriacetic acid, the ratio of the solubilized ferric chelate of nitrilotriacetic acid to solubilized ferrous chelate of nitrilotriacetic acid in said reactant solution being from 0.2 to 6;

(b) removing aqueous admixture from the contacting zone and regenerating admixture by contacting admixture to be regenerated with oxygen in a regeneration zone under conditions to convert solubilized ferrous chelate of nitrilotriacetic acid in the admixture to the solubilized ferric chelate of nitrilotriacetic acid, and producing regenerated reactant solution containing solid sulfur having a ratio of solubilized ferric chelate of nitrilotriacetic acid to solubilized ferrous chelate of nitrilotriacetic acid of from 0.5 to 6;

(c) separating a minor portion of said regenerated reactant mixture having an increased solid sulfur concentration, and heating regenerated reactant mixture having an increased solid sulfur concentration in an at least substantially oxygen-free environment to a temperature sufficient to melt the sulfur, and producing a solution of an iron chelate of nitrilotriacetic acid containing molten sulfur;

(d) separating molten sulfur-containing solution from step (c) in a separation zone in an at least substantially oxygen-free environment into an upper phase comprising substantially sulfur-free regenerated solution of solubilized iron chelates of nitrilotriacetic acid and a lower phase comprising molten sulfur;

(e) recovering molten sulfur from said separation zone; and (f) passing regenerated aqueous reactant solution from step (c) to the contacting zone for use as aqueous reactant solution therein.

13. A process for the removal of $H_2S$ from a sour gaseous stream employing an aqueous reactant solution containing solubilized degradable iron chelates comprising (a) contacting the sour gaseous stream with aqueous reactant solution in a contacting zone at a temperature below the melting point of sulfur, the reactant solution containing solubilized ferric chelate of nitrilotriacetic acid, and solubilized ferrous chelate of nitrilotriacetic acid, under conditions to convert $H_2S$, producing a gaseous stream having a reduced $H_2S$ content, and aqueous admixture containing solid sulfur and an increased concentration of solubilized ferrous chelate of nitrilotriacetic acid, the ratio of the solubilized ferrous chelate of nitrilotriacetic acid in said reactant solution being from 0.2 to 6;

(b) removing aqueous admixture from the contacting zone and regenerating admixture by contacting admixture to be regenerated with oxygen in a regeneration zone under conditions to convert solubilized ferrous chelate of nitrilotriacetic acid in the admixture to the solubilized ferric chelate of nitrilotriacetic acid, and producing regenerated reactant solution containing solid sulfur having a ratio of solubilized ferric chelate of nitrilotriacetic acid to solubilized ferrous chelate of nitrilotriacetic acid of from 0.5 to 6;

(c) separating a minor portion of said regenerated reactant mixture having an increased solid sulfur concentration, and heating regenerated reactant mixture having an increased solid sulfur concentration in an at least substantially oxygen-free environment to a temperature sufficient to melt the sulfur, and producing a solution of an iron chelate of nitrilotriacetic acid containing molten sulfur;

(d) separating molten sulfur-containing solution from step (c) in a separation zone in an at least substantially oxygen-free environment into an upper phase comprising substantially sulfur-free regenerated solution of solubilized iron chelates of nitrilotriacetic acid and a lower phase comprising molten sulfur;

(e) filtering sulfur from step (d) to produce substantially pure molten sulfur, and recovering the sulfur; and (f) passing regenerated aqueous reactant solution from step (c) to the contacting zone for use as aqueous reactant solution therein.

14. The process of claim 13 wherein the stream from which the H$_2$S is removed is selected from naturally-occurring gases, synthesis gases, process gases, CO$_2$-containing streams, and fuel gases.

15. The process of claim 14 wherein the sour gaseous stream is natural gas or a stream derived from the gasification of coal or a liquid hydrocarbon.

16. The process of claim 14 wherein the sour gaseous stream is natural gas.

17. The process of claim 5 wherein substantially sulfur-free solution is recovered and returned for use in the process.

18. The process of claim 6 wherein substantially sulfur-free solution is recovered and returned for use in the process.

19. The process of claim 7 wherein substantially sulfur-free solution is recovered and returned for use in the process.

20. The process of claim 8 wherein substantially sulfur-free solution is recovered and returned for use in the process.

21. The process of claim 12 wherein substantially sulfur-free solution is recovered and returned for use in the process.

22. The process of claim 13 wherein the substantially sulfur-free solution is recovered and returned for use in the process.

23. The process of claim 7 wherein the admixture having an increased solid sulfur concentration is contacted with a reducing gas.

24. The process of claim 23 wherein the reducing gas is an H$_2$S-containing gas.

25. The process of claim 7 wherein the oxygen free environment is maintained by use of a reducing gas.

26. The process of claim 25 wherein the oxygen reducing gas is an H$_2$S containing gas.

27. The process of claim 12 wherein the admixture having an increased solid sulfur concentration is contacted with a reducing gas.

28. The process of claim 27 wherein the reducing gas is an H$_2$S-containing gas.

29. The process of claim 12 wherein the oxygen free environment is maintained by use of a reducing gas.

30. The process of claim 29 wherein the oxygen reducing gas is an H$_2$S containing gas.

* * * * *